(12) United States Patent
Yao et al.

(10) Patent No.: US 11,689,941 B2
(45) Date of Patent: Jun. 27, 2023

(54) COVERAGE ISSUE ANALYSIS AND RESOURCE UTILIZATION ANALYSIS BY MDA

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 17/075,367

(22) Filed: Oct. 20, 2020

(65) Prior Publication Data

US 2021/0037400 A1 Feb. 4, 2021

Related U.S. Application Data

(60) Provisional application No. 62/930,440, filed on Nov. 4, 2019.

(51) Int. Cl.
*H04W 24/02* (2009.01)
*H04W 24/08* (2009.01)
*H04W 84/18* (2009.01)

(52) U.S. Cl.
CPC ......... *H04W 24/02* (2013.01); *H04W 24/08* (2013.01); *H04W 84/18* (2013.01)

(58) Field of Classification Search
None
See application file for complete search history.

(56) References Cited

U.S. PATENT DOCUMENTS

2019/0165988 A1* 5/2019 Wang .................. H04L 41/0631
2019/0394655 A1* 12/2019 Rahman .............. H04L 41/5058
2020/0336923 A1* 10/2020 Li .......................... H04L 41/147

FOREIGN PATENT DOCUMENTS

CN 111372183 A * 7/2020 ............ H04W 24/08
CN 112514344 A * 3/2021 ............ H04L 41/044

* cited by examiner

*Primary Examiner* — Adolf Dsouza
(74) *Attorney, Agent, or Firm* — Schwegman Lundberg & Woessner, P.A.

(57) ABSTRACT

Systems and methods of using a MDAS in a network management loop are described. The MDA is used to aid in analysis and rectification of coverage issues and resource utilization. The MDA prepares, processes and analyzes data related to the managed networks and services using AI and ML techniques, and provides analytics reports for root cause analysis of ongoing issues, prevention of potential issues and prediction of network or service demands. The analytics report contains the description of the issues or predictions and recommended actions to mitigate the issues. The MDA classifies and correlates the input data (current and historical data), learn and recognize the data patterns, and analyzes the data to derive inference, insight and predictions. The MDA returns an analytics report describing issues or predictions for NFs, subnetwork, NSSI, and/or NSI.

17 Claims, 17 Drawing Sheets

COVERAGE ISSUE ANALYSIS AND RESOURCE UTILIZATION ANALYSIS BY MDA

PRIORITY CLAIM

This application claims the benefit of priority under 35 U.S.C. 119(e) to U.S. Provisional Patent Application Ser. No. 62/930,440, filed Nov. 4, 2019, which is incorporated herein by reference in its entirety.

TECHNICAL FIELD

Embodiments pertain to radio access networks. Some embodiments relate to Third Generation Partnership Project Long Term Evolution (3GPP LTE) networks and LTE advanced (LTE-A) networks as well as 4$^{th}$ generation (4G) networks and 5$^{th}$ generation (5G) networks. Some embodiments relate to self-organizing networks (SON) for 5G networks. Some embodiments relate to Physical Layer Cell Identity (PCI) use in 5G SON networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems. To improve the performance and efficiency due to the diversity of devices, services and requirements, a management data analytics services (MDAS) can be used. Management data analytics (MDA) uses analytics input (such as network management data) to determine analytics and diagnose issues impacting the performance of the mobile network, as well as predicting potential future issues.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
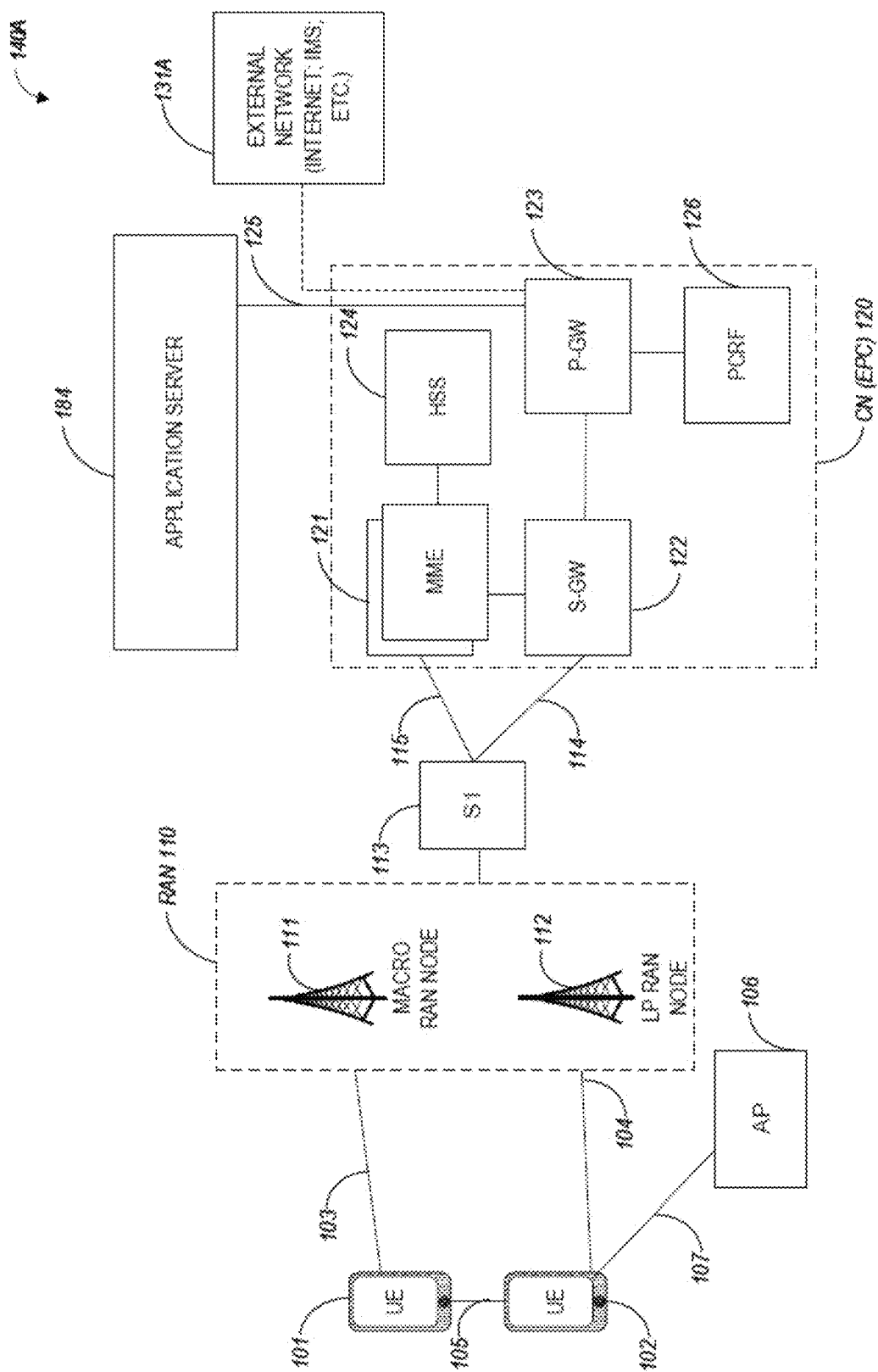
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
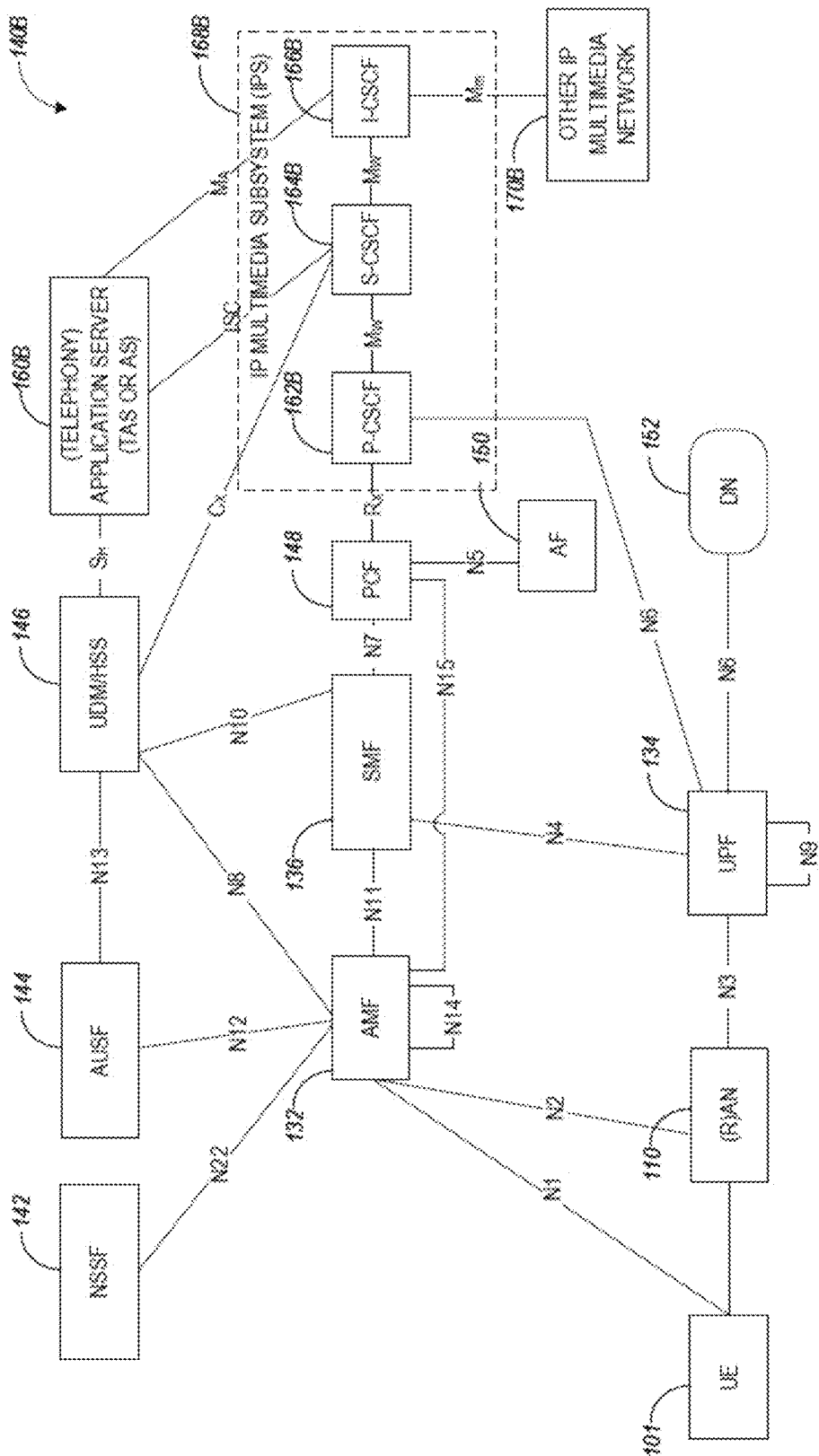
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically. UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132). N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
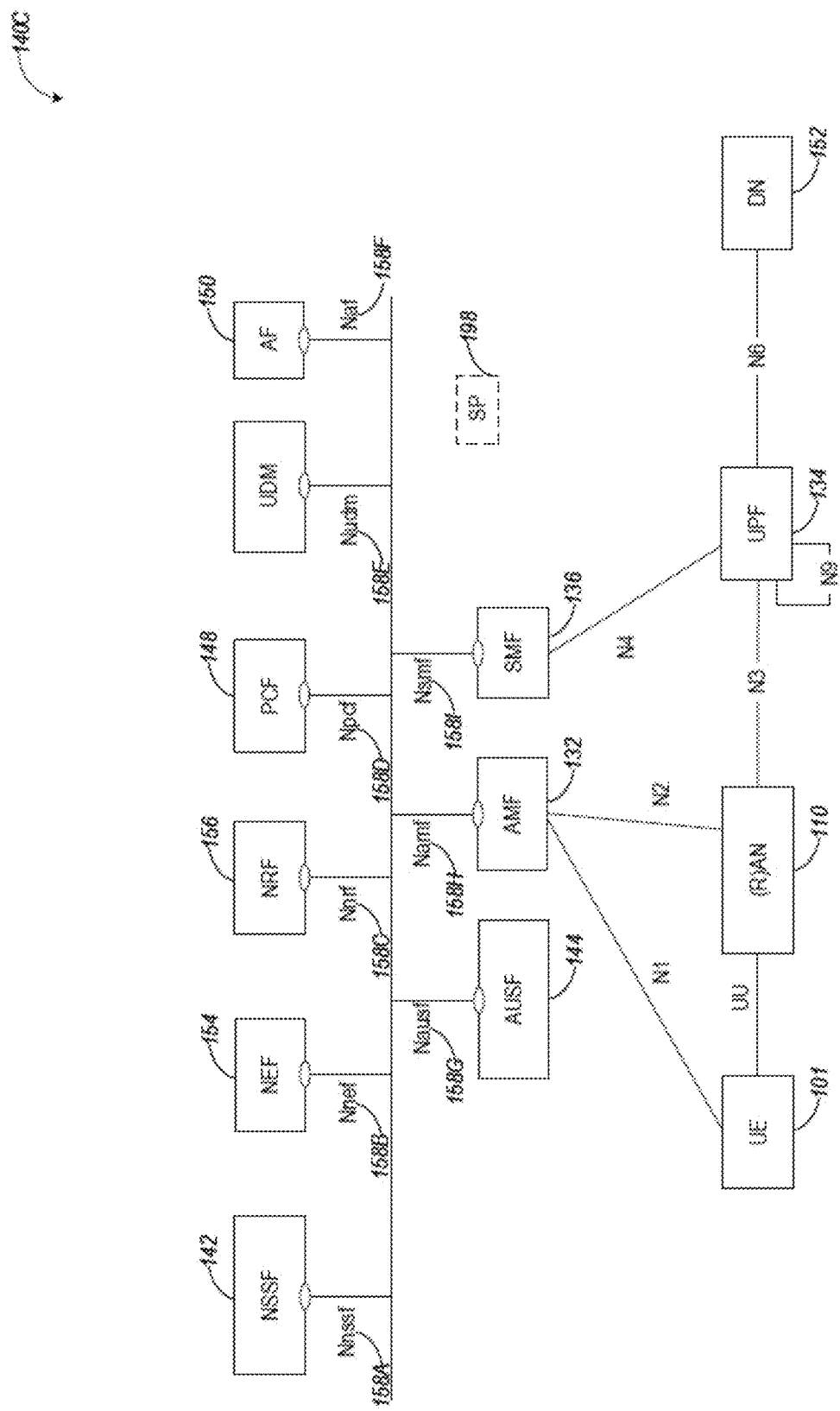
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
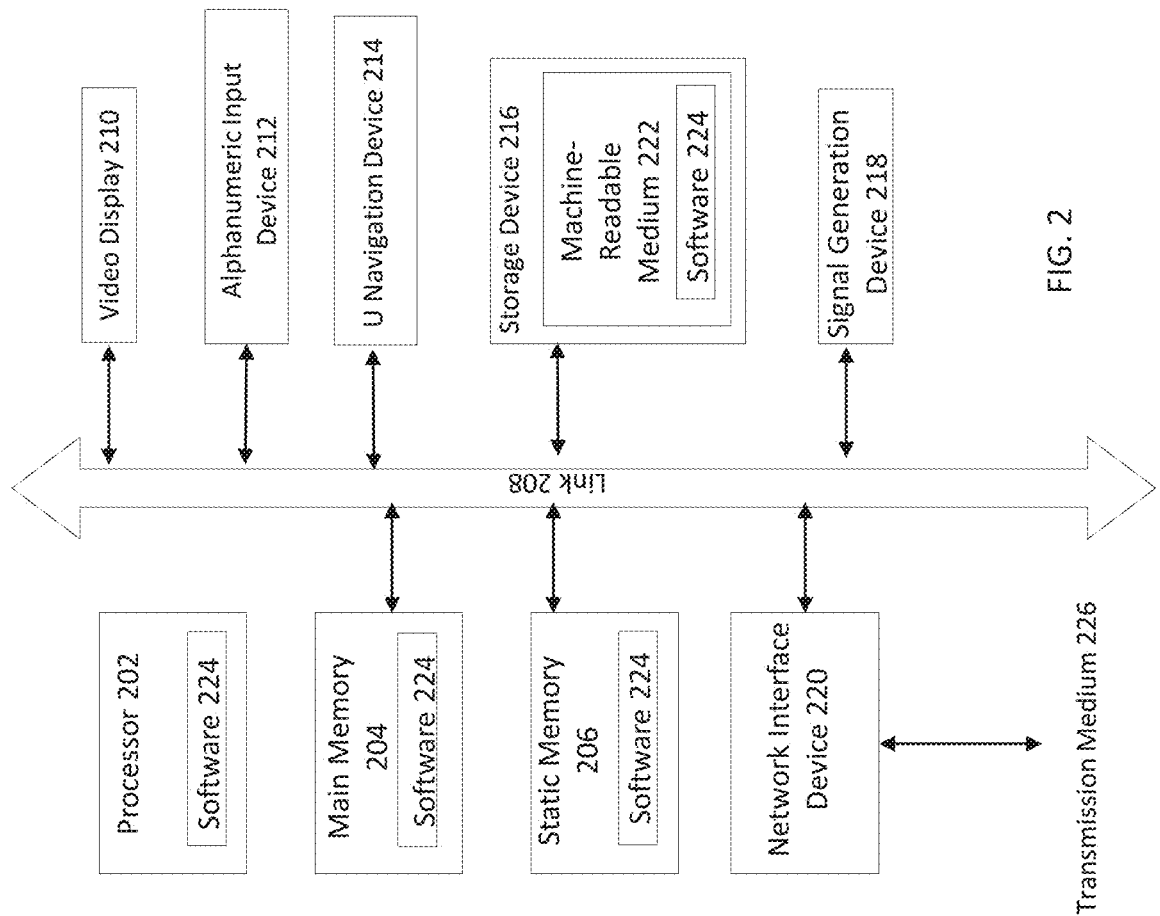
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3:
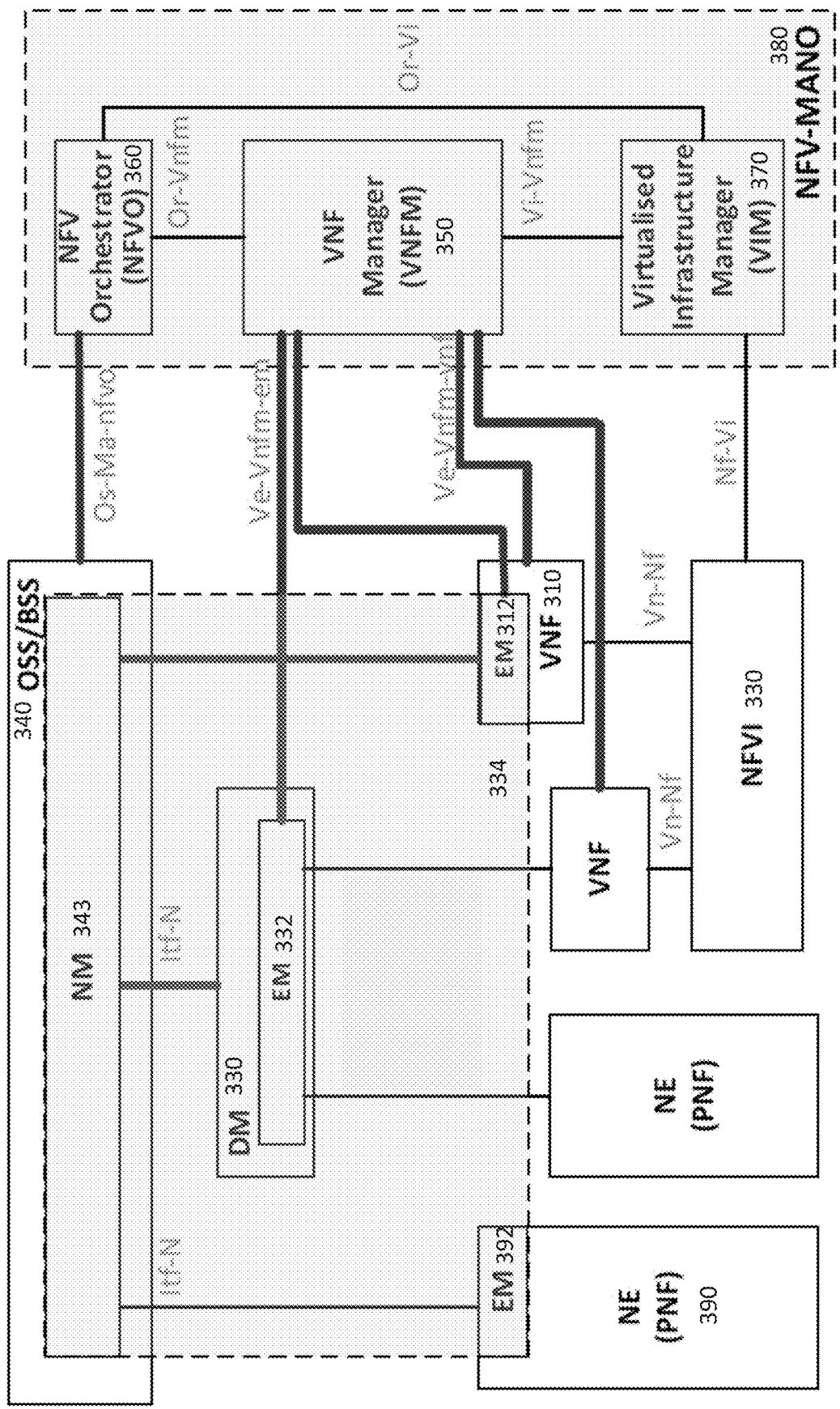
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Virtualization Function Infrastructure (NVFI) 310. Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANO, may comprise a Virtualized Infrastructure Manager (VIM) 340, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 314.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may include a Virtualized Infrastructure Manager (VIM) 370, a VNF Manager (VNFM) 350 and a NFV Orchestrator (NFVO) 360. The NFV-MANO 380 may have access to various data repositories including network services. VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VIM 320 and the EMs and NMs. The former may involve discovering available services, managing virtualized resource availability/allocation/release and providing virtualized resource fault-performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 320 of the same type or of different types. Thus, although only one VNFM 350 is shown in FIG. 3, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NVFI 310 may itself contain various virtualized and non-virtualized resources. These may include a plurality of virtual machines (VMs) 312 that may provide computational abilities (CPU), one or more memories 314 that may provide storage at either block or file-system level and one or more networking elements 316 that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

As above, MDA in a NR network and/or a 5G core network (5GC) is used to diagnose current network issues and predict potential issues. MDA brings intelligence and automation to network management and orchestration using artificial intelligence (AI) and machine language (ML) techniques. MDA provides processing and analysis of raw data related to network and service events and status (e.g., performance measurements, Trace/Minimization of Drive Test (MDT)/Radio Link Failure (RLF)/RRC Connection Establishment Failure (RCEF) reports, quality of experience (QoE) reports, alarms, configuration data, network analytics data, and service experience data from AFs, etc.) to provide an analytics report (including recommended actions) to enable actions for network and service operations. The raw performance data may include raw network data of, for example, of NFs of the network. The management analytics data may be for NFs, sub-networks, Network Slice Subnet Instances (NSSIs), and/or Network Slice Instances (NSIs). For example, the analysis of NSI/NSSI resource usage can form management analytics data indicating whether a certain resource is deteriorating. The analysis and correlation of the overall performance data of network may indicate overload and potential failure(s).

Figure 4:
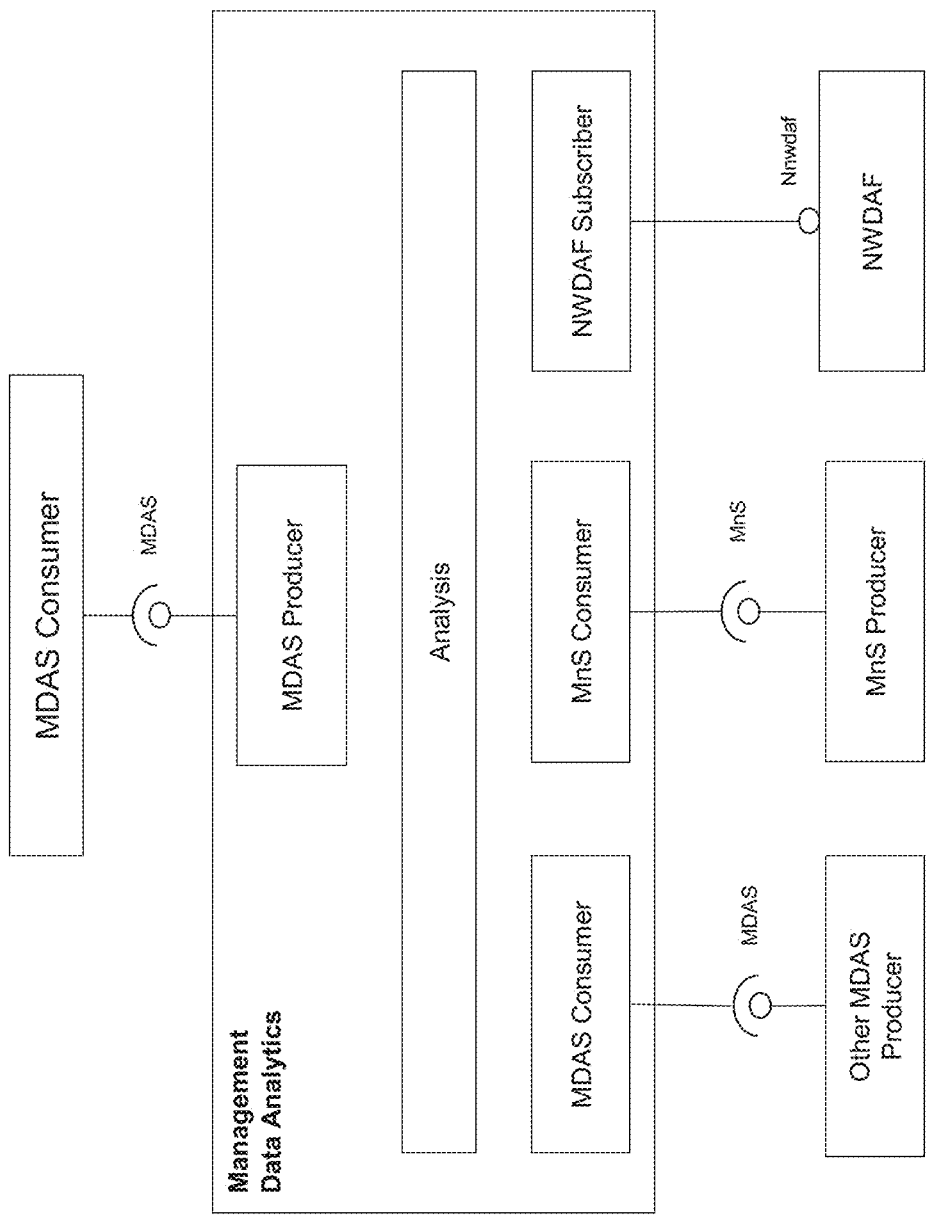
FIG. 4 illustrates a functional overview of Management Data Analytics (MDA) in accordance with some embodiments.

FIG. 4 illustrates a functional overview of MDA in accordance with some embodiments. Depending on the scenario, MDA 400 may collect data for analysis by acting as an MDAS Consumer, and/or as a management service (MnS) Consumer, and/or as a network data analytics function (NWDAF) subscriber. After analysis, MDA acts as an MDAS Producer to expose the analysis results to MDAS Consumers.

MDA can help to perform management tasks in preparation, commissioning, operation as well as in the termination phases. For example, MDA can support service provisioning by preparing service catalogues, evaluating network requirements for a new service and carrying out a feasibility check. During the operation phase, the MDA can identify ongoing issues impacting the performance of the network and service, and discover in advance the potential issues that would cause potential failure and/or performance degradation. MDA can also assist to predict the network and service demand to enable the timely resource provisioning and deployments which would allow fast time-to-market network and service deployment.

MDAS can be consumed by various consumers, for instance the management functions (MFs) (i.e., MnS service producers/consumers for network and service management), network functions (NFs) (e.g., NWDAF), self-organizing network (SON) functions, network and service optimization tools/functions, Service Level Specification (SLS) assurance functions, human operators, and application functions (AFs), etc.

Figure 5:
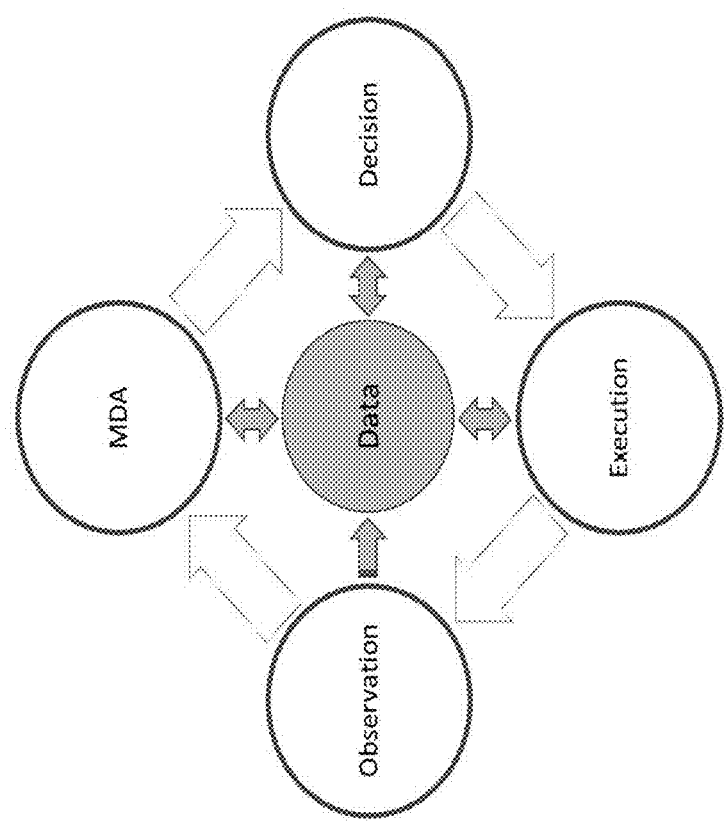
FIG. 5 illustrates an MDA role in a management loop in accordance with some embodiments.

MDA is one step of a management loop (which can be open loop or closed loop) and brings intelligence and generates value by processing and analysis of management and network data, where the AI and ML techniques are widely used. FIG. 5 illustrates an MDA role in a management loop in accordance with some embodiments. The management loop in FIG. 5 contains multiple roles.

A first role in the management loop is observation of the managed networks and services. Observation involves monitoring and collection of events, status and performance of the managed networks and services, and providing the observed/collected data (e.g., performance measurements, Trace/MDT/RLF/RCEF reports, network analytics reports. QoE reports, alarms, etc).

A second role in the management loop is management data analytics for the managed networks and services. The MDA prepares, processes and analyzes the data related to the managed networks and services, and provides the analytics reports for root cause analysis of ongoing issues, prevention of potential issues and prediction of network or service demands. The analytics report contains the description of the issues or predictions and optionally the recommended actions. The MDA can be enabled by AI and ML techniques (e.g., ML model) with the input data including not only the observed data of the managed networks and services, but also the execution reports of actions (taken by the execution step). The MDA classifies and correlates the input data (current and historical data), learn and recognize the data patterns, and makes analysis to derive inference, insight and predictions.

A third role in the management loop is decision making for the management actions for the managed networks and services. The management actions are decided based on the analytics reports (provided by MDA) and other management data (e.g., historical decisions made) if desired. The decision may be made by the consumer of MDAS (in the closed management loop), or a human operator (in the open management loop). The decision includes what actions to take, and when to take the actions.

A fourth role in the management loop is execution of the management actions according to the decisions. During the execution step, the actions are carried out to the managed networks and services, and the reports (e.g., notifications, logs) of the executed actions are provided.

6.1.1.3 Possible Solutions on Coverage Issue Analysis

A coverage issue may cause UE and network failures and degrade the network performance offered to the UEs. The coverage issue could be weak coverage, a coverage hole, pilot pollution, overshoot coverage, or DL/UL channel coverage mismatch. Weak coverage may result in a low success rate of random access, paging, RRC connection establishment and handover, low data throughput, more abnormal releases of RRC connection. DRB retainability, QoS flow and/or PDU session resources, and dissatisfied QoE. A coverage hole is a more severe problem and would further lead to out of service issues in the area.

Step 1: The MDAS producer correlates, processes and analyzes the following data within a time period on a regular basis to identify and describe the coverage issue:

Performance measurements (provided by the performance management (PM) service):

Average/distribution of UE reported Reference Signal Received Power (RSRPs)/Reference Signal Received Quality (RSRQs)/Signal-to-Interference-plus-Noise Ratio (SINRs) of the serving cell when the Timing Advance (TA) or UE Rx-Tx applied to the UEs is in a specific range;

Average/distribution of UE reported RSRPs/RSRQs/SINRs of each neighbour cell when the UE reported RSRPs/RSROs of the serving cell is in a specific range, measured per neighbour cell relation (NCR), per synchronization signaling block (SSB) index and per Channel-State Information (CSI) Reference Signal (CSI-RS) index of each NCR:

Number of abnormal releases of data radio bearers (DRBs), quality of service (QoS) flows, packet data unit (PDU) sessions, and UE contexts in the serving cell measured per SSB index and per CS-RS index:

MDT reports (provided by MDT service):

MDT reports containing RSRPs and RSRQs of the serving cell and neighbour cells reported by each UE with anonymous id (e.g., cell radio network temporary identity (C-RNTI)) and location information.

RLF reports (provided by Trace service):

RLF reports containing RSRP(s) and RSRQ(s) of the serving cell and neighbour cells reported by each UE with anonymous id (e.g., C-RNTI) and location information.

RCEF reports (provided by Trace service):

RCEF reports containing RSRP(s) and RSRQ(s) of the serving cell and neighbour cells reported by each UE with anonymous id (e.g., C-RNTI) and location information.

UE location reports (provided by Location Service (LCS)):

UE location information provided by the LCS with the anonymous id (e.g., C-RNTI) which can be used to correlate with the MDT/RLF/RCEF reports.

QoE reports

Geographical data and terrain data of the RAN:

The geographical information (longitude, latitude, altitude) of the deployed RAN (gNBs and eNBs, antennas, sector carrier equipment, etc.)

The terrain data for the area of the deployed RAN.

The configuration data (provided provisioning service):

The current Network Resource Models (NRMs) containing the attributes affecting the RAN coverage, such as maximum transmission power of the cell, directions and tilts of the antennas or beams, etc.

The NRM update reports (notifications or logs) containing the creations or changes of the Managed Object Instance (MOIs) affecting the RAN coverage.

Step 2: The MDAS producer provides the analytics report (in a file) describing the coverage issue. The MDAS producer sends notifications about readiness of the analytics report file to the consumers who have subscribed to the analytics reports on coverage issues. The analytics report contains the following information:

The identifier of the coverage issue: indication that the coverage issue is weak coverage or coverage hole: the start time of the coverage issue: the geographical area and location where the coverage issue exists: root cause of the coverage issue (e.g., weak transmission power, blocked by construction, restricted by terrain, etc.); indication that the coverage issue exists in 5G only or in all RATs: the MOIs of the cells affected by the coverage issue: the severity level (e.g., critical, medium or cleared) of the coverage issue; the recommended actions to solve the coverage issue. The recommended action could be re-configurations of coverage related attributes, creation of new cells or beams, or manual operations to add or change the physical units.

Step 3: The MDAS producer keeps tracking the status of the coverage issue by correlating, processing and analyzing the data as described in step 1, and provides the updates of the analytics report (e.g., in a file) if there is status change (e.g., solved, mitigated or deteriorated) on the coverage issue. The MDAS producer sends notifications about readiness of the updated analytics report file to the consumers who have subscribed to the analytics reports on coverage issues. The updated analytics report contains the following information:

The identifier of the coverage issue; the time of the status change of the coverage issue: updated severity level (e.g., critical, medium, solved) of the coverage issue; and updates of the following information where applicable:

Indication that the coverage issue is weak coverage or coverage hole: the geographical area and location where the coverage issue exists; indication that the coverage issue exists in 5G only or in all RATs: the MOIs of the cells affected by the coverage issue; the recommended actions to solve the coverage issue. The recommended action could be re-configurations of coverage related attributes, creation of new cells or beams, or manual operations to add or change the physical units. Note that a 5G related coverage issue may exist only in 5G (i.e., 5G issue only with good coverage provided by other RATs) or exist in all RATs (i.e., no RAT provides good coverage in the area).

It is desirable that the coverage issue can be detected by MDA from the various symptoms, together with the geographical and terrain data and the configuration parameters of the RAN. Once the coverage issue is detected, the MDAS producer provides the analytics report that precisely describes the coverage issue, and the analytics report contains sufficient information to enable the MDAS consumer (e.g., SON CCO function) to take actions to remedy the issues. The MDAS producer may also provide the recommended actions to solve the identified coverage issue in the analytics report, so that the MDAS consumer can execute the actions accordingly or by taking the recommended actions into account. The MDAS producer is informed when the actions are taken by the MDAS producer consumer to solve the coverage issue described in the analytics report, so that the MDAS producer can start evaluating the result of the executed actions. The MDAS producer gets the execution reports describing the actions taken by the MDAS consumer and takes the execution reports into account to fine-tune the accuracy of the future (new or updated) analytics report. The MDAS producer also provide update(s) of the analytics report to indicate the status change (e.g., solved, mitigated or deteriorated) of the coverage issue.

6.x.1 Resource Utilization Analysis 6.x.1.1 Use Case

The network is a resource limited system, so the ideal resource utilization for the network is that the required resources can be sufficiently allocated while no waste of resources to cause additional CapEx and OpEx.

The resource usage (e.g., NFs) for a network, a portion of network or a network slice could be higher or lower in different time periods depending on the traffic patterns. The traffic patterns could vary in different areas (e.g., business area, entertainment area and residential area) of the network, and could vary for different network slices. It could happen that at some point in some areas or network slices the resources are of shortage while in some other areas or network slices there are redundant resources. This may result in that the users cannot be satisfactorily served in some areas or network slices due to lack of resources even though the maximum capacity is sufficient. Resource shortage may lower down the user data throughput, prolong the user data delay, raise the rejections and failures for establishment of new connections (e.g., RRC connection), sessions (e.g., PDU session) and resources (e.g., QoS flows, DRBs, etc.) and increase the drops of the existing connections, sessions and resources.

Therefore, it would be desirable that the spare resource of the lower usage areas or network slices can be re-allocated to the areas or network slices that desire more resources at the same moment to prevent the resource shortage from happening.

The MDA can analyze the current and historical performance data related to resource usage and network traffic for the network or network slices, and identify the ongoing issues on resource utilization and predict the potential issues.

The MDAS producer provides the analytics report describing the ongoing and/or potential resource utilization issues to the authorized consumers. The issues need to be described precisely, including (but limited to) the information about which part of the network or network slice has encountered or is going to encounter the resource utilization issue, it is resource shortage or resource excess, in which time period, etc. The MDAS producer may also provide the recommendations to solve the resource utilization issues in the analytics report, the recommended actions may be for example to schedule the "scale-in" and "scale out" of VNFs to dynamically (re-)allocate the virtualized resources to where they are needed, or to create/update the resource allocation policy for different network slices to allow the network slices getting different percentage of resources in different time periods according the traffic patterns.

The MDAS producer gets the execution reports of the actions taken by the MDAS consumer to solve the resource utilization issue and takes the execution reports into account in the following analysis.

The MDAS producer continue analyzing the reported issue and provides update(s) if there is any status change (e.g., solved, mitigated or deteriorated) till it is solved.

6.x.1.2 Potential Requirements

REQ-RES-ANA-1 The MDAS producer should have a capability allowing the authorized consumer to get the analytics report describing the resource utilization issue.

REQ-RES-ANA-2 The MDAS producer should have a capability to provide the analytics report describing the resource utilization issue for a part of network or network slice to the authorized consumer based on the performance measurements related to resource usage and network traffic, the configured resource allocation policies, and the actions executed that had impact to the resource utilization.

REQ-RES-ANA-3 The analytics report describing the resource utilization issue should contain the following information: the identifier of the resource utilization issue: indication that it is an ongoing issue or potential issue; the time period(s) during which the resource utilization issue has happened or is going to happen; indication that resource issue is shortage or excess in each time period: percentage of resource shortage or excess in each time period: the network entities (e.g., NR cell) involved in the resource utilization issue, the network slices (identified by S-NS-SAIs) involved in the resource utilization issue: the recommended actions to solve the coverage issue.

REQ-RES-ANA-4 The MDAS producer should have a capability to provide the updates of the analytics report to indicate the status change (e.g., solved, mitigated or deteriorated) of the resource utilization issue.

The MDAS producer correlates and analyzes the ongoing and/or potential resource utilization issues based on the current and historical performance data related to resource usage and network traffic for the network or network slices. The required data can be from the RAN domain, CN domain or both. Based on the analysis above, the MDAS producer is able to provide the domain specific or cross domain analytics report related with resource utilization analytics triggered by event or periodically.

To assist the feasibility check, the MDAS producer may consider the following information: capacity planning of the network slice instance and/or network slice subnet instance, existing active or non-active network slice instance and/or network slice subnet instance resource information, slice provisioning requirements, etc.

Note that MDAS can be deployed at different levels, for example, at domain level (e.g., RAN, CN, NSSI) or in a centralized manner (e.g., in a PLMN level). A domain-level MDAS provides domain specific analytics, e.g., resource usage prediction in a CN or failure prediction in a NSSI, etc. A centralized MDAS can provide end-to-end or cross-domain analytics service, e.g., resource usage or failure prediction in an NSI, optimal CN node placement for ensuring lowest latency in the connected RAN, etc. For example, a Domain MDAF produces domain MDAS. The domain MDAS is consumed by the Centralized MDAF and other authorized MDAS Consumers (for example, infrastructure manager, network manager, slice manager, slice subnet manger, other 3rd party OSS, etc.). The Centralized MDAF produces centralized MDAS, which is consumed by different authorized MDAS Consumers.

Figure 6:
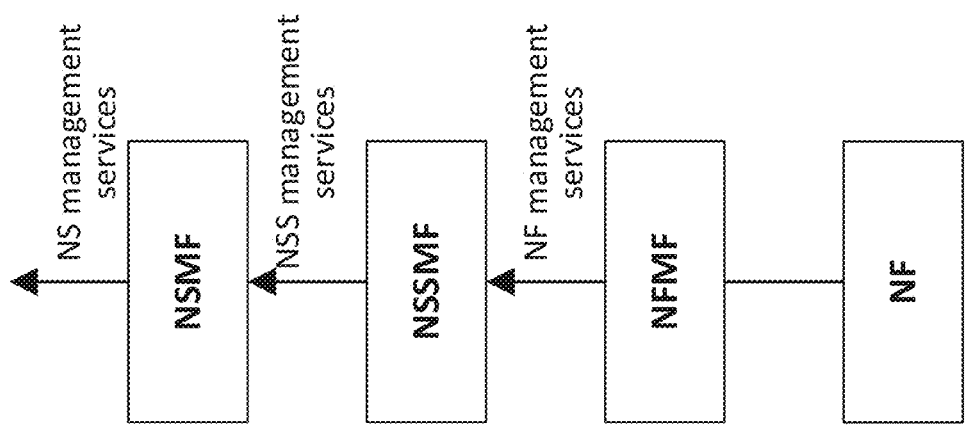
FIG. 6 illustrates management services in accordance with some embodiments.

MS-2. Management Services 5G management is based on Service Based Architecture (SBA) where each management function is a producer that produces management services to be consumed by other management functions. FIG. 6 illustrates management services in accordance with some embodiments. A management service offers management capabilities. These management capabilities are accessed by management service consumers via standardized service interface composed of individually specified management service components.

In FIG. 6, the NFMF provides NF management services to the NSSMF; the NSSMF consumes NF management services to provide NSS management services to NSMF; and the NSMF consumes NSSMF management services to provide NS management services to other management entity.

Figure 7:
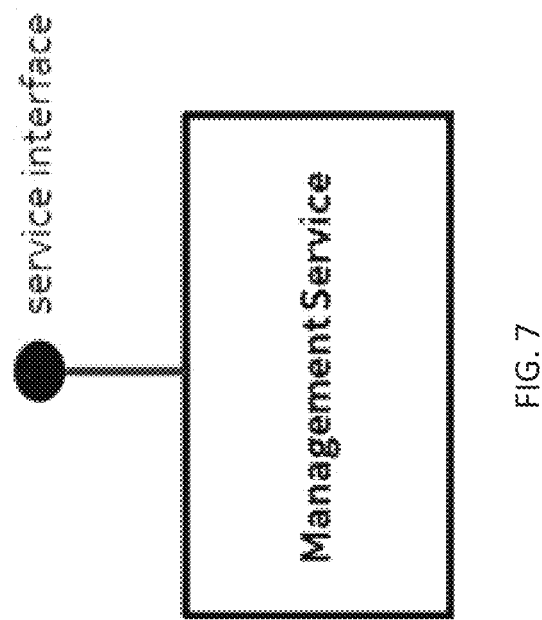
FIG. 7 illustrates a management service in accordance with some embodiments.

A management service offers management capabilities. These management capabilities are accessed by management service consumers via standardized service interface composed of individually specified management service components. FIG. 7 illustrates a management service in accordance with some embodiments.

Figure 8:
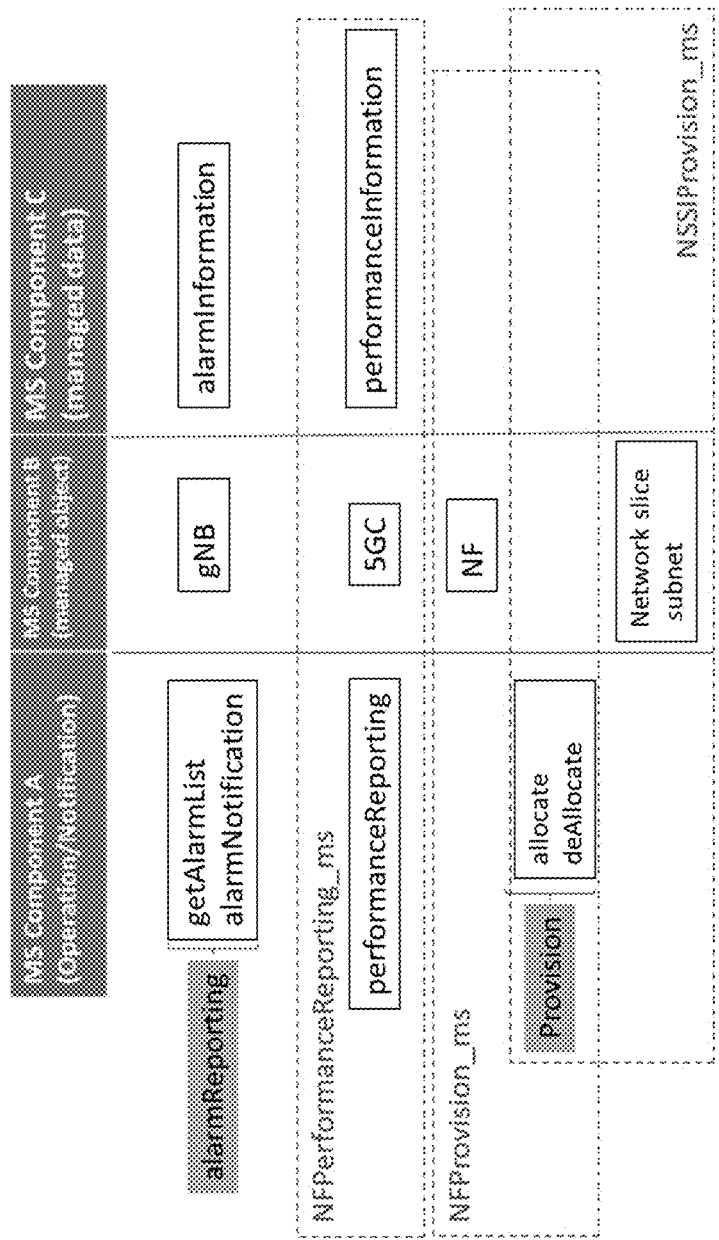
FIG. 8 illustrates a management service and component types in accordance with some embodiments.

A management service may include a management service component type A and management service component type B: a management service component type A, management service component type B, and management service component type C; or any combination of management component types A, B, and/or C. FIG. 8 illustrates a management service and component types in accordance with some embodiments. FIG. 8 shows an example of management service and related management service component type A, type B and type C.

MS-3. Management Service Components

A management service combines elements of management service component type A, B and C. The management service components are combined to allow a management service consumer to interact with a management service producer via a specified service interface.

MS-3.1. Management Service Component Type A

Management service component type A is a group of management operations and/or notifications agnostic of managed entities.

MS-3.2. Management Information

MS-3.2.1. Management Service Component type B

Management service component type B is the management information represented by information model of managed entities. Management service component type B includes the following models: 1) Network resource model for NG-RAN and NR as defined in 3GPP TS 28.541; 2) Network resource model for 5GC as defined in 3GPP TS 28.543; 3) Network slice information model as defined in 3GPP TS 28.532; 4) Network slice subnet information model as defined in 3GPP TS 28.532.

MS-3.2.2. Management Service Component Type C

Management service component type C is performance information of the managed entity and fault information of the managed entity.

Management service component type C includes the following information: 1. Alarm information as defined in 3GPP TS 28.546; 2. Performance data as defined in 3GPP TS 28.552, 3GPP TS 28.553, 3GPP TS 28.554, and 3GPP TS 32.425 v16.4.0.

In embodiments, management service component type C could be merged with Management service component type B. Mechanisms for collecting MDT data may also be included.

MS-3.3. Management Capability Exposure Governance

Figure 9:
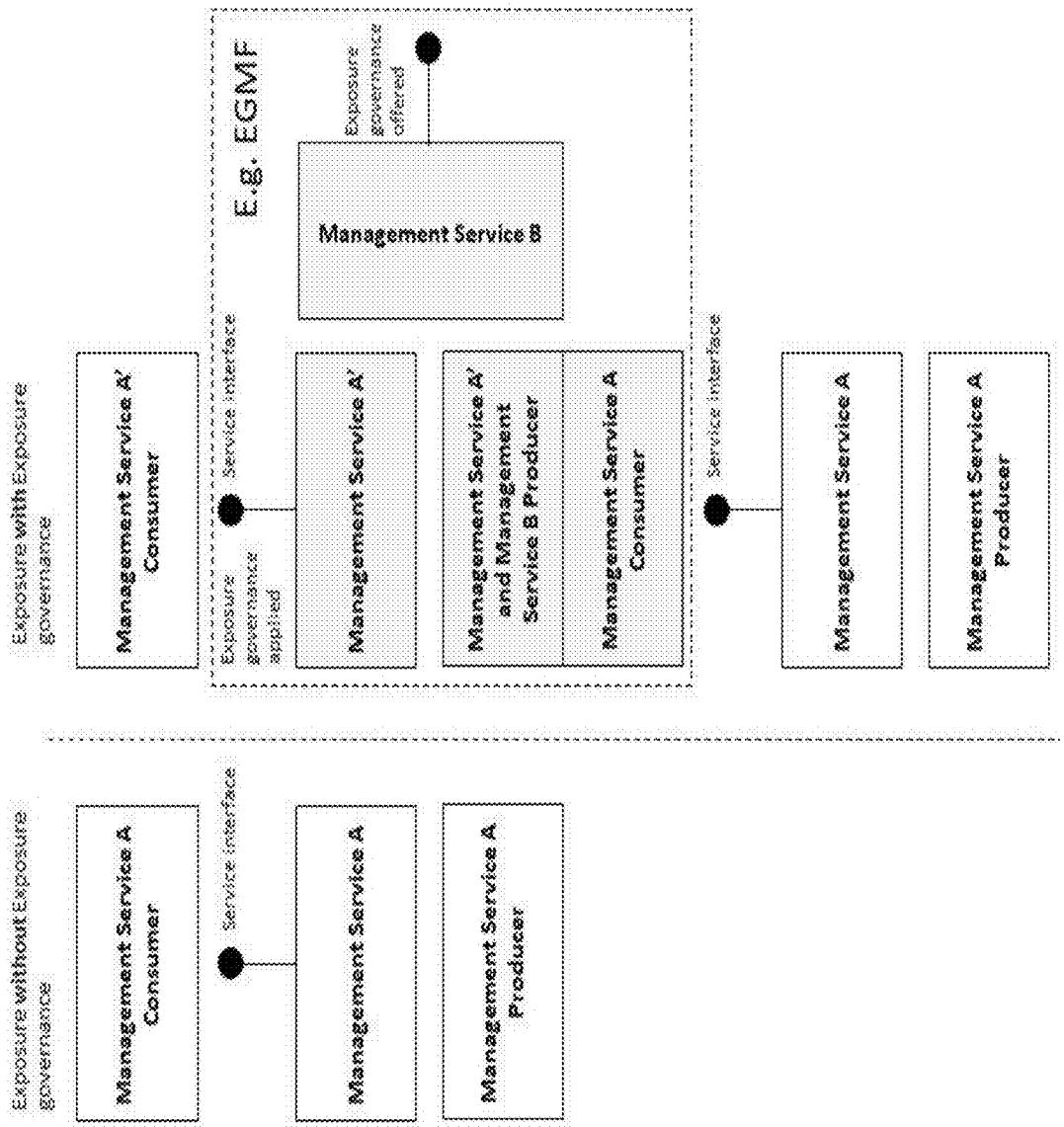
FIG. 9 illustrates management capability exposure governance applied on exposed Management Service A in accordance with some embodiments.

FIG. 9 illustrates management capability exposure governance applied on exposed Management Service A in accordance with some embodiments. Management capability exposure governance provides exposure governance on basic elements of management function service-based interface: 1) Management service component type A, 2) Management service component type B, 3) Management service component type C.

As shown by FIG. 9, when there is a Management Service A exposure without exposure governance, Management Service A' Consumer can access all management capability offered by Management Service A' Producer. When Management Service A is exposed with applied exposure governance it becomes Management Service A'. Management Service A' Consumer can access Management Service A' after following steps:

Management Service A, exposed by Management Service A' Producer, is consumed by Management Service A' Consumer; Management Service B, exposed by Management Service B Producer, is consumed by Operator who applies exposure governance on exposed Management Service A: Management Service A' Producer produces Management Service A. The Management Service A' Consumer, that consumes Management Service A, the Management Service B and Management Service A' Producer, that produces Management Service B (with management capability exposure governance) and Management Service A, can be represented as one management function entity (e.g., EGMF).

MS-3.4. Management Function (MF) Concept

Figure 10:
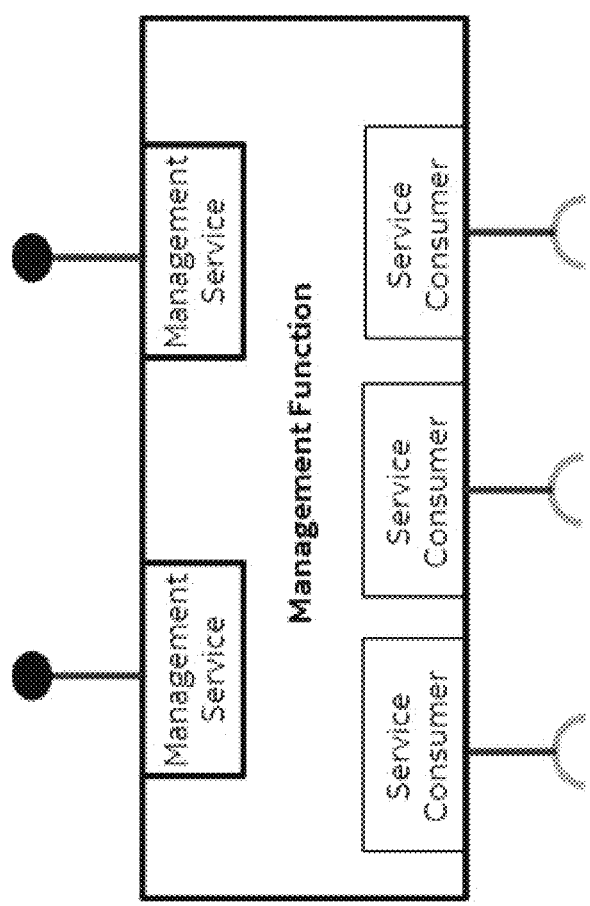
FIG. 10 illustrates management function and management services in accordance with some embodiments.

FIG. 10 illustrates management function and management services in accordance with some embodiments. The MF is a management entity whose externally-observable behavior and interfaces are specified by 3GPP. In the service-based management architecture, MF plays the role of either Management Service producer or Management Service consumer. A Management Service produced by MF may have multiple consumers. The MF may consume multiple Management Services from one or multiple Management Service producers. An example of an MF playing both roles (Management Service producer and consumer) is illustrated by FIG. 10.

Figure 11:
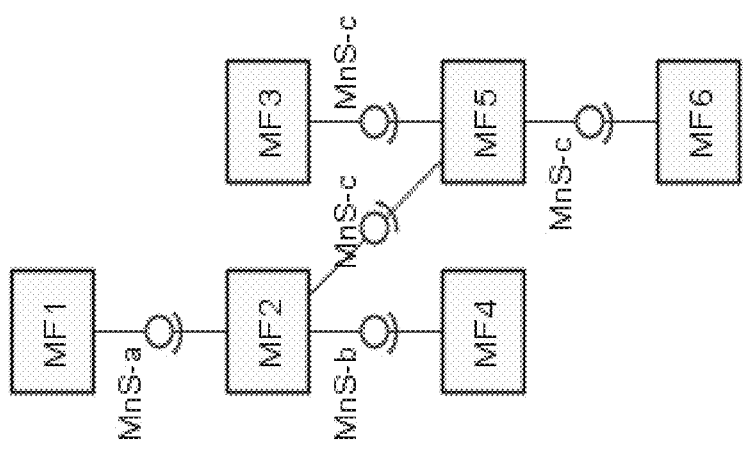
FIG. 11 illustrates interactions between management functions in accordance with some embodiments.

Management Functions may interact by consuming Management Services produced by other Management Functions. FIG. 11 illustrates interactions between management functions in accordance with some embodiments. FIG. 11 illustrates multiple scenarios, including: MF1 produces Management Service MnS-a; MF2 consumes Management Service MnS-a produced by MF1 and produces Management Services MnS-b and MnS-c; MF3 produces Management Service MnS-c; MF4 consumes Management Service MnS-b produced by the MF2; and MF5 consumes Management Services MnS-c produced by the MF2 and MF3, and in turn produces the same Management Service MnS-c. The behaviour of MF5 may be seen as aggregation of Management Services MnS-c.

MS-3.5 Management Data Analytics Capability

As above, mobile networks have the capability to support a variety of services, increasing flexibility of the network may cause management challenges. The raw performance data (also called network data) of NFs of the mobile network can be analyzed, together with other management data (e.g., alarm information, configuration data), and formed into one or more MDA for NFs, sub-networks, NSSIs or NSIs. The MDA can be used to diagnose ongoing issues impacting the performance of the mobile network and predict any potential issues (e.g., potential failure and/or performance degradation). For example, the analysis of NSI/NSSI resource usage can form a management analytical data indicating whether a certain resource is deteriorating. The analysis and correlation of the overall performance data of mobile network may indicate overload situation and potential failure(s). SON Capacity and Coverage Optimization (CCO) is one typical case that may consume the management analytical data CCO provides optimal coverage and capacity for the E-UTRAN (see e.g., clause 4.5 of 3GPP TS 28.628), which may also be applicable for 5G radio networks. The management analytical data related to coverage and capacity help the SON CCO to realize the situation of coverage and capacity or interference, and to trigger corresponding optimization if needed.

Figure 12:
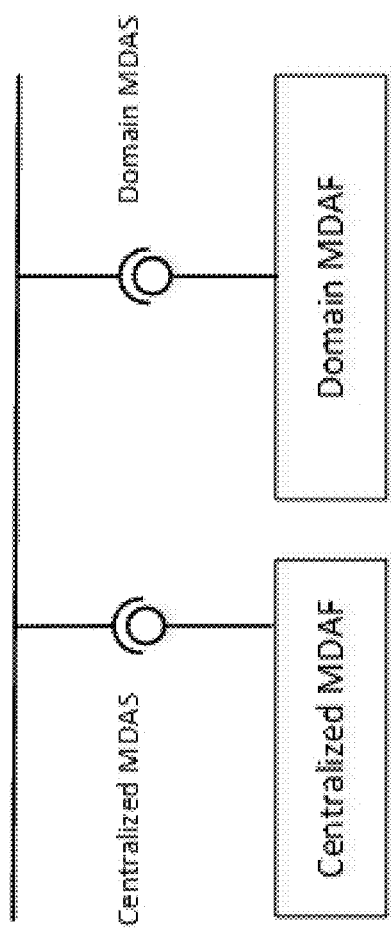
FIG. 12 illustrates a service-based architecture for management data analytics in accordance with some embodiments.
Figure 13:
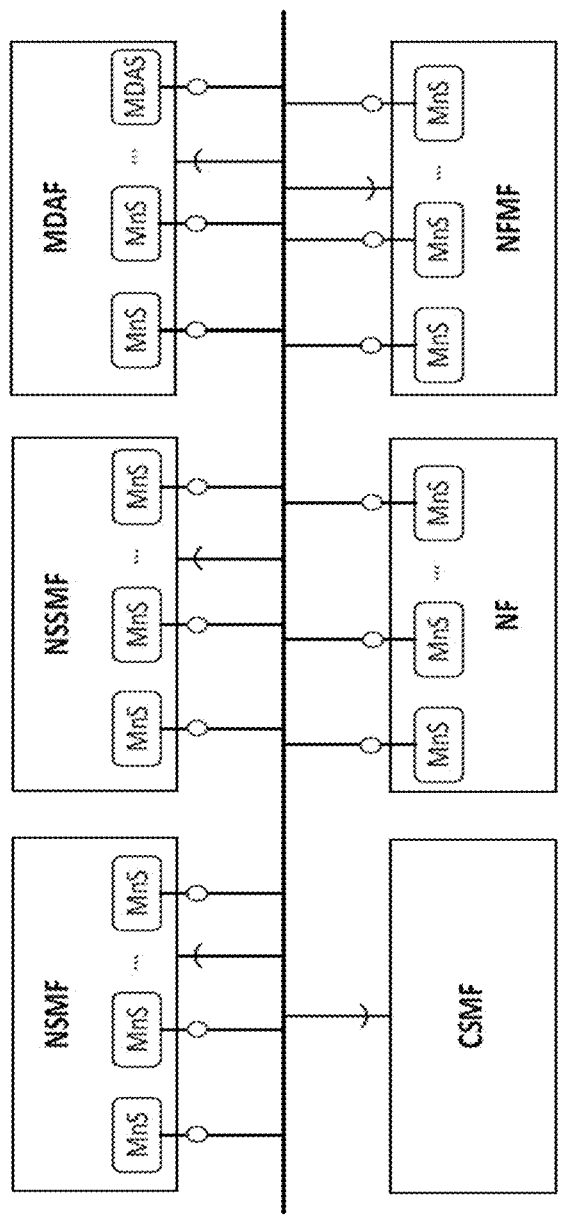
FIG. 13 illustrates MDAS in accordance with some embodiments.

The management system can benefit from MDAS to make the mobile network more efficient in responding to various requests. The MDA utilize the network management data collected from the network and make the corresponding analytics based on the collected information. For example, the information provided by PM MnS can be used to optimize network performance, and the information provided by FM MnS can be used to predict and prevent failures of the network. For mobile networks with slicing, a network slice data analytics service can consume performance measurements and fault measurements data for its constituent network slice subnets. FIG. 12 illustrates a service-based architecture for management data analytics in accordance with some embodiments.

Figure 14:
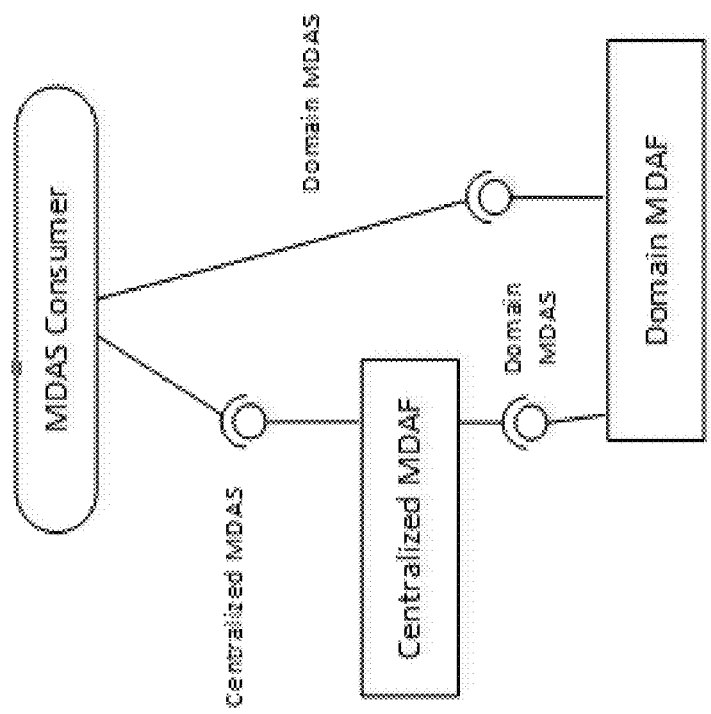
FIG. 14 illustrates MDAS deployment in accordance with some embodiments.

FIG. 14 illustrates MDAS in accordance with some embodiments. The MDAS being provided by a Management Data Analytics Function (MDAF), which is/are consumed by other management functions. The management services for a mobile network including network slicing may be produced by a set of functional blocks. This annex shows an example of such deployment scenario where functional blocks (e.g., NSMF, NSSMF, NFMF and CSMF) are producing and consuming various management services.

In this deployment example the NFMF provides the management services for one or more NF and may consume some management services produced by other functional blocks. The NF provides some management services, for example the NF performance management services, NF configuration management services and NF fault supervision services. NSSMF provides the management services for one or more NSSI and may consume some management services produced by other functional blocks. NSMF provides the management services for one or more NSI and may consume some management services produced by other functional blocks. The MDAF provides the MDAS for one or more NF, NSSI and/or NSI, and may consume some management services produced by other functional blocks, and the CSMF consumes the management service(s) provided by the other functional blocks. This deployment example does not illustrate what management services the CSMF consumes. In this example, one functional block may consume the management service(s) provided by another functional block, depending on the management scope of the functional block(s). The scope may be expressed in the terms of Management Service Components.

MS-3.6 Utilization of Management Data Analytics Services

Figure 15:
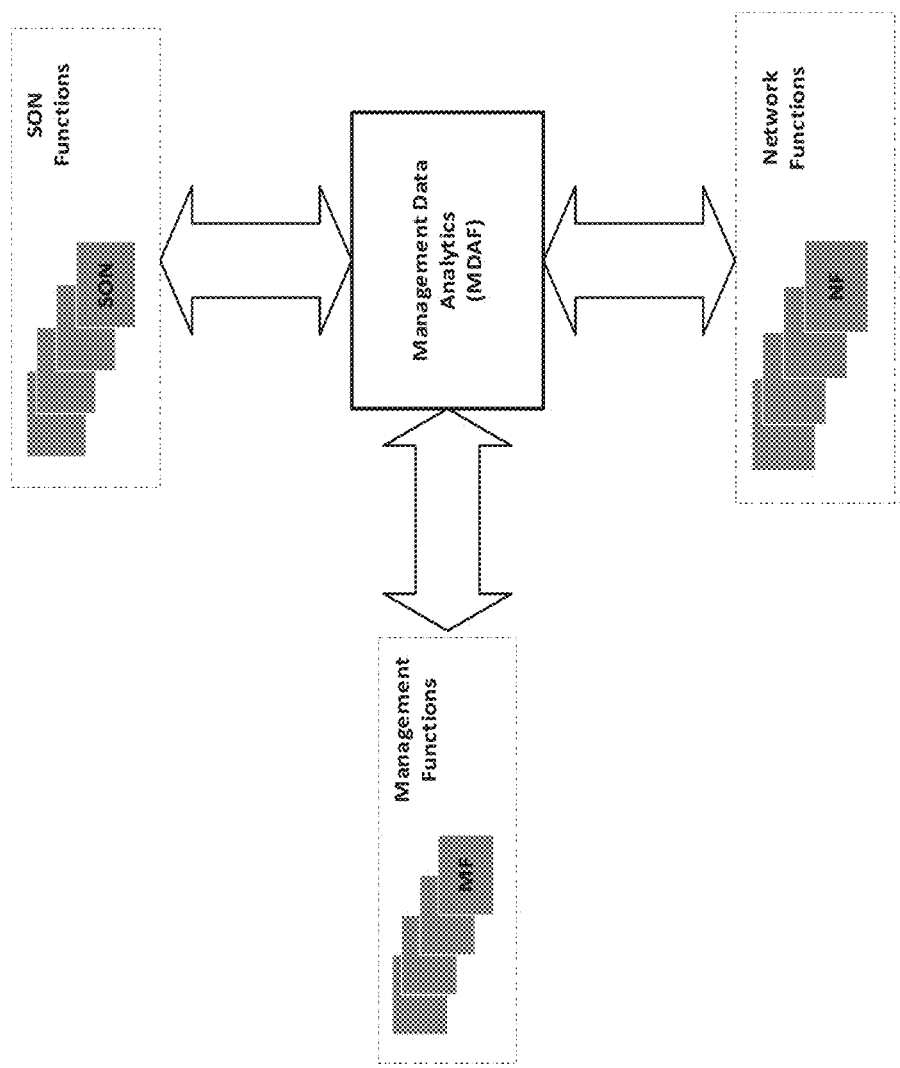
FIG. 15 illustrates MDAS and self-organizing network (SON) features in accordance with some embodiments.

MDAS can be deployed at different levels, for example, at domain level (e.g., for RAN, CN, NSSI) or in a centralized manner (e.g., for a PLMN level). A domain-level MDAS provides domain specific analytics, e.g., resource usage prediction in a CN or failure prediction in a NSSI, etc. A centralized MDAS can provide end-to-end or cross-domain analytics service, e.g., resource usage or failure prediction in an NSI, optimal CN node placement for ensuring lowest latency in the connected RAN, etc. FIG. 15 illustrates MDAS deployment in accordance with some embodiments.

In the example of FIG. 15, the Domain MDAF produces domain MDAS. The domain MDAS is consumed by the Centralized MDAF and other authorized MDAS Consumers (for example, infrastructure manager, network manager, slice manager, slice subnet manger, other 3rd party OSS, etc.). The Centralized MDAF produces centralized MDAS, which is consumed by different authorized MDAS Consumers.

MS-3.7 Management Data Analytics Service and SON Function

MDA for 5G networks has been defined in 3GPP TS 28.550 and is also discussed in 3GPP TS 28.530 and 3GPP TS 28.533. It utilizes both management and network data collected through management services and from network functions (including e.g. service, slicing and/or network functions related data) and makes the corresponding analytics based on the collected information. These analytics services (e.g., MDAS) can be made available and consumed by other management and SON functions. FIG. 16 illustrates MDAS and self-organizing network (SON) features in accordance with some embodiments. FIG. 16 gives a high level illustration of potential interaction and utilization of the MDAS.

Therefore, it may be important that the following concept is observed and considered for the development of use cases and requirements: SON functions may utilise the services provided by the management data analytics (e.g., MDAS) to conduct their functionalities and control actions. Other potential interactions between the entities are not shown in the diagram in FIG. 16 above.

SON Aspects

The 3GPP management system includes a 3GPP Cross Management Domain and a Management Domain. Based on the location of the SON algorithm, SON is categorized into centralized SON (e.g., Cross Domain-Centralized SON, Domain-Centralized SON), distributed SON and hybrid SON. The C-SON, D-SON, and H-SON concepts are defined for LTE in 3GPP TS 32.500.

In C-SON, the SON algorithm(s) is/are located in the 3GPP management system. For C-SON, 3GPP management system monitors the networks via management data, analyzes the management data (e.g., by management data analytics), makes decisions on the SON actions, and executes the SON actions towards the networks. The management data may vary for different the SON cases. For example, for automated creation of NSI, NSSI and/or NFs related cases, the management data may be SLA requirements received from service management layer; for automated optimization related cases, the management data may be performance measurements of the networks; for automated healing related cases, the management data may be alarm information of the networks. The management data is to be specified case by case. The monitoring, analysis, decision and execution process also applies to monitoring the result of already executed SON actions, evaluating the results (by analyzing the historical and current management data), making decisions on new SON actions (which may move forward or backward of the prior actions), and the executing the new SON actions. In C-SON, the 3GPP management system monitors and executes SON actions in and across multiple network domains such as RAN and Core.

C-SON has two variants: cross Domain-Centralized SON where SON algorithms are executed at 3GPP Cross Management Domain Layer, and Domain-Centralized SON where SON algorithms are executed at Management Domain layer. For Cross Domain-Centralized SON, the 3GPP Cross Management Domain monitors the networks via management data, analyzes the management data, makes decisions on the SON actions, and executes the SON actions. For Domain-Centralized SON, Management Domain monitors the networks via management data, analyzes the management data, makes decisions on the SON actions, and executes the SON actions. In Domain-Centralized SON, the 3GPP Cross Management Domain is responsible for management and control of the Domain-Centralized SON Functions. The management and control may include switching on/off a Domain-Centralized SON function, making policies for a Domain-Centralized SON function, and/or evaluating the performance of a Domain-Centralized SON function In D-SON, the SON algorithm(s) is/are located in individual NFs. For D-SON, the NFs monitor the network events, analyze the network data, make decisions on the SON actions, and execute the SON actions in the network nodes. The 3GPP management system is responsible for management and control of the D-SON functions. The management and control may include switching on/off a D-SON function, making policies for a D-SON function, providing supplementary information (e.g., the value range of an attribute) to a D-SON function, and/or evaluating the performance of a D-SON function.

In H-SON, the SON algorithm(s) is/are partially located in the 3GPP management system and partially located in the NFs. The 3GPP management system and NFs work together, in a coordinated manner, to build up a complete SON algorithm. The decisions on SON actions may be either made by 3GPP management system or NFs, depending on the specific cases. For H-SON, the C-SON component monitors and executes SON actions in and across multiple network domains such as RAN and Core.

Examples of the SON functions/algorithms include self-establishment of NFs and/or automated SW management, AAS Optimization, ANR management including automatic X2 and Xn setup, PCI configuration (including PCI configuration according to the various embodiments discussed herein), automatic radio configuration data (ARCF), load balanace optimization, interference coordination including inter-cell interference coordination, RACH optimization, Capacity and Coverage Optimization (CCO) including Centralized CCO and Distributed CCO, self-healing, SON coordination, SON for AAS-based deployments, subscriber/equipment tracing, MDT collection, mobility robustness optimization (MRO), Energy Savings Management (ESM) including intra-RAT ESM, inter-RAT ESM, and/or other like SON functions. Aspects of some or all of these SON functions are discussed in more detail in 3GPP TR 28.861, 3GPP TR 28.627, 3GPP TS 28.628, and the like.

Accordingly, an apparatus for a new radio (NR) network and/or a 5G Core Network (5GC) may contain processing circuitry to configure the apparatus to operate as a Management Data Analytics Service (MDAS) producer, the processing circuitry configured to: obtain, from network functions (NFs) of a managed network and service, raw network data of the managed network and service; obtain management data from management functions of the managed network and service; analyze the raw network data and the management data to: diagnose ongoing issues impacting performance of the managed network and service, the ongoing issues including at least one of coverage issues or resource utilization in the managed network or by the managed service, and form predictions of potential issues of, or network and service demand for, the managed network and service; and provide an analytics report describing the issues or predictions for at least one of: one of the NFs, a sub-network, a Network Slice Subnet, or a Network Slice.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for at least one of a new radio (NR) network, the apparatus comprising:
    processing circuitry to configure the apparatus to operate as a Management Data Analytics Service (MDAS) producer, the processing circuitry configured to:
        obtain, from network functions (NFs) of a managed network and service, raw network data of the managed network and service;
        obtain management data from management functions of the managed network and service;
        analyze the raw network data and the management data to:
            diagnose ongoing issues impacting performance of the managed network and service, the ongoing issues including at least one of coverage issues or resource utilization issues in the managed network or by the managed service, and
            form predictions of potential issues of, or network and service demand for, the managed network and service;
        provide an analytics report describing the issues or predictions for one of the NFs; and
        for each coverage issue: determine a root cause of the coverage issue based on a set of obtained data and provide the analytics report describing the coverage issue, the analytics report comprising an identifier of the coverage issue, an indication that the coverage issue is weak coverage or a coverage hole; a start time of the coverage issue; a geographical area and location where the coverage issue exists; the root cause of the coverage issue, an indication which radio access technology the coverage issue exists in; managed object instances (MOIs) of cells affected by the coverage issue; a severity level of the coverage issue; and at least one recommended action to solve the coverage issue; and
    memory to store the raw network data and management data.

2. The apparatus of claim 1, wherein the processing circuitry is configured to:
    classify and correlate current and historical data of the raw network data and the management data;
    determine data patterns based on the current and historical data; and
    analyze the current and historical data in conjunction with the management analytical data to diagnose the ongoing issues and form the predictions.

3. The apparatus of claim 1, wherein the processing circuitry is configured to analyze the raw network data and the management data to determine a root cause and multiple symptoms of at least one of the ongoing issues, the symptoms including alarm information, performance degradation, and user complaints.

4. The apparatus of claim 1, wherein the processing circuitry is configured to obtain, as the raw network data and the management data, network performance measurements, Trace/Minimization of Drive Test (MDT) statistics, Radio Link Failure (RLF) statistics, Radio Resource Control (RRC) Connection Establishment Failure (RCEF) reports, quality of experience (QoE) reports, alarm information, and network configuration data.

5. The apparatus of claim 1, wherein the processing circuitry is configured to obtain the raw network data and the management data within a predetermined time period on a regular basis to identify and describe the coverage issue.

6. The apparatus of claim 1, wherein the processing circuitry is configured to select, as the raw network data and the management data for the coverage issue, the set of obtained data from among:
performance measurements provided by a performance management service, including:
at least one of:
average and distribution of measurements of reference signals from a serving cell and neighboring cells provided by UEs, or
number of abnormal releases of data radio bearers (DRBs), quality of service (QoS) flows, packet data unit (PDU) sessions, and UE contexts in the serving cell;
Minimization of Drive Test (MDT) reports;
Radio Link Failure (RLF) reports;
Radio Resource Control (RRC) Connection Establishment Failure (RCEF) reports;
UE location information of the UEs;
Quality of Experience (QoE) reports;
Geographical data, terrain data and configuration data related to a deployed radio access network (RAN) of the managed network; and
Network Resource Models (NRMs) containing attributes affecting RAN coverage and NRM update reports of the NRMs.

7. The apparatus of claim 1, wherein the processing circuitry is configured to continue to:
track a status of the coverage issue to determine whether the status of the coverage issue has changed; and
provide an update of the analytics report in response to a determination that the status of the coverage issue has changed.

8. The apparatus of claim 1, wherein the recommended actions comprise at least one of re-configurations of coverage related attributes, creation of new cells or beams, or manual operations to add or change physical units that provide the coverage.

9. The apparatus of claim 1, wherein the processing circuitry is configured to provide the analytics report to a self-organizing network (SON) Capacity and Coverage Optimization (CCO) to take actions to remedy the coverage issue.

10. The apparatus of claim 1, wherein the processing circuitry is configured to:
receive information regarding actions taken to solve the coverage issue have been taken via execution reports describing the actions taken; and
in response to reception of the information, evaluate a result of the actions having been taken to fine-tune an accuracy of a future analytics report for the coverage issue.

11. The apparatus of claim 1, wherein the processing circuitry is configured to:

obtain the raw network data and the management data to determine resource utilization in the managed network or a network slice of the managed network;
analyze current and historical performance data of the raw network data and the management data related to the resource utilization and network traffic for the network or network slice; and
identify the ongoing issues related to the resource utilization and predict potential issues related to the resource utilization.

12. The apparatus of claim 11, wherein the analytics report indicates the ongoing issues related to the resource utilization, including, which part of the network or network slice has encountered or is going to encounter a resource utilization issue, whether the resource utilization issue is a resource shortage or resource excess, in which time periods the resource utilization issue is to occur, and at least one recommended action to solve the resource utilization issues.

13. The apparatus of claim 12, wherein the at least one recommended action comprise scheduling of "scale-in" and "scale out" of virtual network functions to dynamically re-allocate virtualized resources to where the virtualized resources are to be used, and creation or updating of a resource allocation policy for different network slices to allow the network slices getting a different percentage of resources in different time periods according traffic patterns.

14. The apparatus of claim 11, wherein the analytics report comprises an identifier of the resource utilization issue, an indication that the resource utilization issue is an ongoing issue or potential issue, and for each time period: an indication that the resource utilization issue is a shortage or excess and a percentage of resource shortage or excess.

15. A non-transitory computer-readable storage medium that stores instructions for execution by one or more processors configured to operate as a Management Data Analytics Service (MDAS) producer, the instructions when executed configure the one or more processors to:
obtain, from network functions (NFs) of a managed network and service, raw network data of the managed network and service;
obtain management data from management functions of the managed network and service;
analyze the raw network data and the management data to:
diagnose coverage issues impacting performance of the managed network and service, and
form predictions of future coverage issues of impacting the performance of the managed network and service;
provide an analytics report describing the coverage issues and predictions of future coverage issues for one of the NFs; and
for each coverage issue: determine a root cause of the coverage issue based on a set of obtained data and provide the analytics report describing the coverage issue, the analytics report comprising an identifier of the coverage issue, an indication that the coverage issue is weak coverage or a coverage hole; a start time of the coverage issue; a geographical area and location where the coverage issue exists; the root cause of the coverage issue, an indication which radio access technology the coverage issue exists in; managed object instances (MOIs) of cells affected by the coverage issue; a severity level of the coverage issue; and at least one recommended action to solve the coverage issue, the at least one recommended action comprising at least one of re-configurations of coverage related attributes, creation of new cells or beams, or manual operations to add or change physical units that provide a coverage associated with the coverage issue.

16. The medium of claim 15, wherein the instructions when executed configure the one or more processors to select, as the raw network data and the management data, the set of obtained data from among:
performance measurements provided by a performance management service, including:
at least one of:
average and distribution of measurements of reference signals from a serving cell and neighboring cells provided by UEs, or
number of abnormal releases of data radio bearers (DRBs), quality of service (QoS) flows, packet data unit (PDU) sessions, and UE contexts in the serving cell;
Minimization of Drive Test (MDT) reports;
Radio Link Failure (RLF) reports;
Radio Resource Control (RRC) Connection Establishment Failure (RCEF) reports;
UE location information of the UEs;
Quality of Experience (QoE) reports;
Geographical data, terrain data and configuration data related to a deployed radio access network (RAN) of the managed network; and
Network Resource Models (NRMs) containing attributes affecting RAN coverage and NRM update reports of the NRMs.

17. A non-transitory computer-readable storage medium that stores instructions for execution by one or more processors configured to operate as a Management Data Analytics Service (MDAS) producer, the instructions when executed configure the one or more processors to:
obtain, from network functions (NFs) of a managed network and service, raw network data of the managed network and service;
obtain management data from management functions of the managed network and service;
analyze the raw network data and the management data to:
diagnose resource utilization issues of the managed network and service, and form predictions of future resource utilization issues of the managed network and service; and
provide an analytics report describing the resource utilization issues and predictions of future resource utilization issues of the managed network and service for one of the NFs,
wherein the analytics report comprises, for each resource utilization issue: an identifier of the resource utilization issue, an indication that the resource utilization issue is an ongoing issue or potential issue, for each time period: an indication that the resource utilization issue is a shortage or excess and a percentage of resource shortage or excess, and recommended action to solve the resource utilization issue.

* * * * *